(12) United States Patent
Chuang et al.

(10) Patent No.: US 8,237,586 B2
(45) Date of Patent: Aug. 7, 2012

(54) METHOD AND SYSTEM FOR RECOGNIZING STATUSES OF ELECTRIC APPLIANCES

(75) Inventors: Chi-Cheng Chuang, Kaohsiung County (TW); Ray-I Chang, Taipei (TW); Hung-Ren Lai, Hualien County (TW)

(73) Assignee: Institute for Information Industry, Taipei (TW)

( * ) Notice: Subject to any disclaimer, the term of this patent is extended or adjusted under 35 U.S.C. 154(b) by 461 days.

(21) Appl. No.: 12/630,846

(22) Filed: Dec. 4, 2009

(65) Prior Publication Data

US 2011/0121988 A1 May 26, 2011

(30) Foreign Application Priority Data

Nov. 20, 2009 (TW) .............................. 98139598 A (51) Int. Cl.
*G08C 19/16* (2006.01)
(52) U.S. Cl. ..................... 340/870.01; 340/635; 706/54; 702/61; 716/103; 716/105; 716/109

(58) Field of Classification Search ............. 340/870.01, 340/635; 706/54; 702/61; 716/103, 105, 716/109
See application file for complete search history.

(56) References Cited

U.S. PATENT DOCUMENTS

| 5,748,490 A * | 5/1998 | Viot et al. ..................... 716/103 |
| 2011/0125703 A1 * | 5/2011 | Chuang et al. .................. 706/54 |

* cited by examiner

*Primary Examiner* — Lam T Mai
(74) *Attorney, Agent, or Firm* — Jianq Chyun IP Office (57) ABSTRACT

A method and a system for recognizing the statuses of electric appliances are provided. In the present method, a loop is taking as a unit for recognition, and a power consumption factor sensor which is capable of measuring a single power consumption factor is used such that the current status of each electric appliance in the loop can be recognized by comparing the probability distribution of the power consumption factor. Since it is not needed to dispose an extra measuring device on each electric appliance, the cost of recognizing the statuses of the electric appliances is significantly reduced.

20 Claims, 6 Drawing Sheets

METHOD AND SYSTEM FOR RECOGNIZING STATUSES OF ELECTRIC APPLIANCES

CROSS-REFERENCE TO RELATED APPLICATION

This application claims the priority benefit of Taiwan application serial no. 98139598, filed Nov. 20, 2009. The entirety of the above-mentioned patent application is hereby incorporated by reference herein and made a part of specification.

BACKGROUND OF THE INVENTION

1. Field of the Invention

The present invention generally relates to a method for recognizing the statuses of electric appliances, and more particularly, to a method and a system for recognizing the statuses of electric appliances by taking a loop as a unit.

2. Description of Related Art

The concepts of environmental protection and energy conservation have been brought up and increasingly focused along with the decrease of petroleum, electricity, and other natural resources. According to statistical data, about 39% of the energy resources are used in our residential environment. Thus, smart meters with energy calculation and management functions are used in more and more buildings in order to provide different power consumption information related to the residential environment to the users in real time.

Generally speaking, the most direct method of understanding the power consumption status of each electric appliance in a building is to dispose a measuring device (for example, a small electricity meter) on each electric appliance. In addition, if the power consumption status of each electric appliance is to be collected and analyzed, radio frequency (RF) communication devices or power line communication (PLC) devices need to be installed on the electric appliances or the small electricity meters such that the power consumption information of the electric appliances can be sent to a backend platform to be analyzed through these communication devices. However, if there are too many electric appliances in a building, the method of disposing a measuring device and a communication device on each of the electric appliances will be too labor-consuming and cost-consuming.

On the other hand, even though some electric appliances with built-in power measurement devices in the market can obtain their own power consumption information, the prices of these electric appliances are usually too high. Furthermore, external measuring devices and communication devices still have to be disposed on existing electric appliances in a building to obtain the power consumption information thereof if not all the electric appliances in the building are replaced.

SUMMARY OF THE INVENTION

Accordingly, the present invention is directed to an electric appliance status recognition method, wherein the status of each electric appliance in a loop is determined by taking the loop as a unit.

The present invention is directed to an electric appliance status recognition system, wherein the status of each electric appliance in a loop is determined according to the probability distribution of values of a single power consumption factor.

The present invention provides an electric appliance status recognition method suitable for detecting n electric appliances in a loop according to a single power consumption factor, wherein the electric appliances respectively have a plurality of statuses, and n is a positive integer. First, the variation of the power consumption factor on each of the electric appliances in each of the statuses is obtained so as to establish a status power consumption probability distribution of each electric appliance in each state. Then, the statuses of the electric appliances are permuted to generate a plurality of status combinations of the electric appliances. Next, a combined power consumption probability distribution is established with respect to each of the status combinations by using the status power consumption probability distribution of each of the electric appliances in the statuses within the status combination. After that, a mapping relationship between the status combinations and a plurality of reference values of the power consumption factor is established according to the combined power consumption probability distributions of the status combinations. After detecting a current measurement of the power consumption factor of the loop, the current measurement is compared with the reference values to determine the status combination corresponding to the electric appliances.

According to an embodiment of the present invention, the step of obtaining the variation of the power consumption factor on each of the electric appliances in each of the statuses to establish the status power consumption probability distribution of the electric appliance in the status includes selecting one of the electric appliances as a sampling electric appliance, collecting a plurality of variation values of the power consumption factor within a sampling time with the sampling electric appliance in each of the statuses, and calculating a probability of each of the variation values within the sampling time, so as to establish the status power consumption probability distribution in each of the statuses, and the electric appliance status recognition method also includes selecting another one of the electric appliances as the sampling electric appliance and repeating aforementioned steps until all the electric appliances are processed.

According to an embodiment of the present invention, the step of establishing the combined power consumption probability distribution of each of the status combinations includes calculating the probabilities of a plurality of sums of variation values of the electric appliances in each of the status combinations according to the status power consumption probability distributions of the electric appliances in the statuses defined by the status combination, so as to establish the combined power consumption probability distribution.

According to an embodiment of the present invention, the step of establishing the mapping relationship between the status combinations and the reference values of the power consumption factor according to the combined power consumption probability distributions of the status combinations includes serving the sums of variation values in the combined power consumption probability distributions of the status combinations as the reference values, setting a mapping relationship between the reference values corresponding to the sums of variation values and a single status combination among the status combinations when the sums of variation values only appear in the combined power consumption probability distribution of the single status combination, and setting a mapping relationship between the reference values corresponding to the sums of variation values and multiple status combinations among the status combinations and recomposing the probabilities of the sums of variation values in the combined power consumption probability distributions of the multiple status combinations to generate a plurality of recomposed probabilities corresponding to the multiple status combinations when the sums of variation values appear in the combined power consumption probability distributions of the multiple status combinations.

According to an embodiment of the present invention, the step of comparing the current measurement with the reference values to determine the status combination corresponding to the electric appliances further includes determining whether a variation between the current measurement and a previous measurement of the power consumption factor of the loop is greater than a predetermined value and comparing the current measurement with the reference values to determine the status combination corresponding to the electric appliances if the variation between the current measurement and the previous measurement is greater than the predetermined value.

According to an embodiment of the present invention, the step of comparing the current measurement with the reference values to determine the status combination corresponding to the electric appliances further includes locating a target reference value tallying with the current measurement among the reference values and determining that the electric appliances are in the statuses defined by a single status combination if the target reference value is corresponding to the single status combination.

According to an embodiment of the present invention, the step of comparing the current measurement with the reference values to determine the status combination corresponding to the electric appliances further includes locating a target reference value tallying with the current measurement among the reference values, respectively obtaining a recomposed probability of each of multiple status combinations if the target reference value is corresponding to the multiple status combinations, and determining that the electric appliances are in the statuses defined by one of the multiple status combination having the higher recomposed probability.

According to an embodiment of the present invention, the step of comparing the current measurement with the reference values to determine the status combination corresponding to the electric appliances further includes locating a target reference value tallying with the current measurement among the reference values, obtaining a previous status combination corresponding to the electric appliances if the target reference value is corresponding to multiple status combinations, and comparing the previous status combination with the multiple status combinations to determine that the electric appliances are in the statuses defined by the status combination having a smaller variation from the previous status combination.

According to an embodiment of the present invention, the power consumption factor includes at least one of power, volt-ampere, volt, watt-hour, kilowatt-hour, reactive power, and current.

The present invention also provides an electric appliance status recognition system including a power consumption factor sensor, a status factor establishing module, and an electric appliance status recognition module. The power consumption factor sensor detects a measurement of a power consumption factor of a loop, wherein the loop includes n electric appliances, the electric appliances respectively have a plurality of statuses, and n is a positive integer. The status factor establishing module obtains a variation of the power consumption factor on each of the electric appliances in each of the statuses to establish a status power consumption probability distribution of the electric appliance in the status. The status factor establishing module also permutes the statuses of the electric appliances to generate a plurality of status combinations of the electric appliances, establishes a combined power consumption probability distribution of each of the status combinations by using the status power consumption probability distribution of each of the electric appliances in the status within the status combination, and establishes a mapping relationship between the status combinations and a plurality of reference values of the power consumption factor according to the combined power consumption probability distributions of the status combinations. The electric appliance status recognition module is coupled to the power consumption factor sensor and the status factor establishing module. After obtaining a current measurement of the power consumption factor of the loop from the power consumption factor sensor, the electric appliance status recognition module compares the current measurement with the reference values to determine the status combination corresponding to the electric appliances.

According to an embodiment of the present invention, the status factor establishing module selects one of the electric appliances as a sampling electric appliance, collects a plurality of variation values of the power consumption factor within a sampling time with the sampling electric appliance in each of the statuses, and calculates a probability of each of the variation values within the sampling time, so as to establish the status power consumption probability distribution in each of the statuses, and then the status factor establishing module selects another one of the electric appliances as the sampling electric appliance and repeats aforementioned operations until all the electric appliances are processed.

According to an embodiment of the present invention, the status factor establishing module calculates the probabilities of a plurality of sums of variation values of the electric appliances in each of the status combinations according to the status power consumption probability distributions of the electric appliances in the statuses defined by the status combination, so as to establish the combined power consumption probability distribution.

According to an embodiment of the present invention, the status factor establishing module serves the sums of variation values in the combined power consumption probability distributions of the status combinations as the reference values. When the sums of variation values only appear in the combined power consumption probability distribution of a single status combination, the status factor establishing module sets a mapping relationship between the reference values corresponding to the sums of variation values and the single status combination. When the sums of variation values appear in the combined power consumption probability distributions of multiple status combinations, the status factor establishing module sets a mapping relationship between the reference values corresponding to the sums of variation values and the multiple status combinations and recomposes the probabilities of the sums of variation values in the combined power consumption probability distributions of the multiple status combinations to generate a plurality of recomposed probabilities corresponding to the multiple status combinations.

According to an embodiment of the present invention, the electric appliance status recognition module determines whether a variation between the current measurement and a previous measurement of the power consumption factor of the loop is greater than a predetermined value. If the variation between the current measurement and the previous measurement is greater than the predetermined value, the electric appliance status recognition module compares the current measurement with the reference values to determine the status combination corresponding to the electric appliances.

According to an embodiment of the present invention, the electric appliance status recognition module locates a target reference value tallying with the current measurement among the reference values. If the target reference value is corresponding to a single status combination, the electric appliance status recognition module determines that the electric appliances are in the statuses defined by the single status combination.

According to an embodiment of the present invention, the electric appliance status recognition module locates a target reference value tallying with the current measurement among the reference values. If the target reference value is corresponding to multiple status combinations, the electric appliance status recognition module respectively obtains a recomposed probability of each of the multiple status combinations and determines that the electric appliances are in the statuses defined by the status combination having the higher recomposed probability.

According to an embodiment of the present invention, the electric appliance status recognition module locates a target reference value tallying with the current measurement among the reference values. If the target reference value is corresponding to multiple status combinations, the electric appliance status recognition module obtains a previous status combination corresponding to the electric appliances and compares the previous status combination with the multiple status combinations to determine that the electric appliances are in the statuses defined by the status combination having a smaller variation from the previous status combination.

According to an embodiment of the present invention, the electric appliance status recognition system further includes a result output device coupled to the electric appliance status recognition module, wherein the result output device displays the current statuses of the electric appliances.

According to an embodiment of the present invention, the power consumption factor includes one of power, volt-ampere, volt, watt-hour, kilowatt-hour, reactive power, and current, and the power consumption factor sensor includes one of an ammeter, an electricity meter, a watt-hour meter, and a power meter.

As described above, in the present invention, a loop is taken as a unit for recognition, and the current status of each electric appliance in a loop is determined according to a single power consumption factor through probability distribution comparison. Thereby, it is not needed to dispose an additional measuring device on each of the electric appliances, and accordingly the cost for recognizing the statuses of the electric appliances is significantly reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
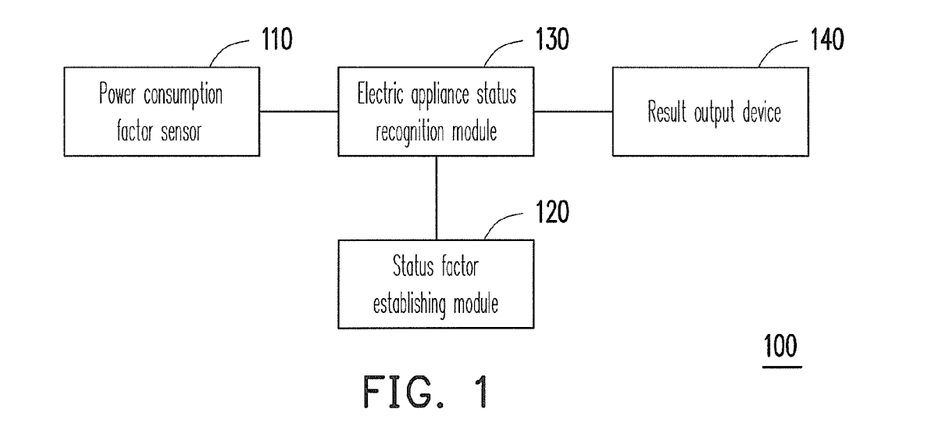
FIG. 1 is a block diagram of an electric appliance status recognition system according to an embodiment of the present invention.

FIG. 1 is a block diagram of an electric appliance status recognition system according to an embodiment of the present invention. Referring to FIG. 1, the electric appliance status recognition system 100 includes a power consumption factor sensor 110, a status factor establishing module 120, an electric appliance status recognition module 130, and a result output device 140.

The power consumption factor sensor 110 may be an ammeter, a power meter, an electricity meter, a watt-hour meter, or a power meter for detecting the measurement of a power consumption factor of a loop. The power consumption factor sensor 110 is capable of detecting a single power consumption factor, wherein the power consumption factor may be power, volt-ampere, volt, watt-hour, kilowatt-hour, reactive power, or current. In the present embodiment, there are n electric appliances in the loop (n is a positive integer), and each of the electric appliances has a plurality of statuses. For example, the power consumption factor sensor 110 is placed on a panel meter of a residential environment if the statuses of electric appliances in the residential environment are to be detected.

The status factor establishing module 120 obtains a variation of the power consumption factor on each of the electric appliances to establish a status power consumption probability distribution of each electric appliance in the loop in each of the statuses thereof. Then, the status factor establishing module 120 permutes the statuses of each electric appliance in the loop to generate a plurality of status combinations of the electric appliance, and meanwhile, establishes a combined power consumption probability distribution corresponding to each of the status combinations. The status factor establishing module 120 establishes a mapping relationship between the status combinations and a plurality of reference values of the power consumption factor according to the combined power consumption probability distributions of all the status combinations.

The electric appliance status recognition module 130 is coupled to both the power consumption factor sensor 110 and the status factor establishing module 120. After obtaining a current measurement of the power consumption factor of the loop through the power consumption factor sensor 110, the electric appliance status recognition module 130 determines the current status of each electric appliance in the loop according to the mapping relationship established by the status factor establishing module 120.

The result output device 140 is coupled to the electric appliance status recognition module 130 for displaying current statuses of the electric appliances in the loop. For example, the result output device 140 may be a computer system, a server, or an information presentation panel, etc. However, the scope of the result output device 140 is not limited thereto. The result output device 140 may be coupled to the electric appliance status recognition module 130 through a network or a physical line to obtain the recognition result of the electric appliance status recognition module 130 and display the statuses of the electric appliances to be inspected by a user.

In the present embodiment, the electric appliance status recognition system 100 takes a loop as a recognition unit and recognizes the current status of each electric appliance in the loop through the power consumption probability distribution of the electric appliance in each status. In the electric appliance status recognition system 100, it is not needed to dispose any additional measuring device or communication device on each electric appliance. Thereby, the cost of detecting the statuses of the electric appliances is reduced.

Figure 2:
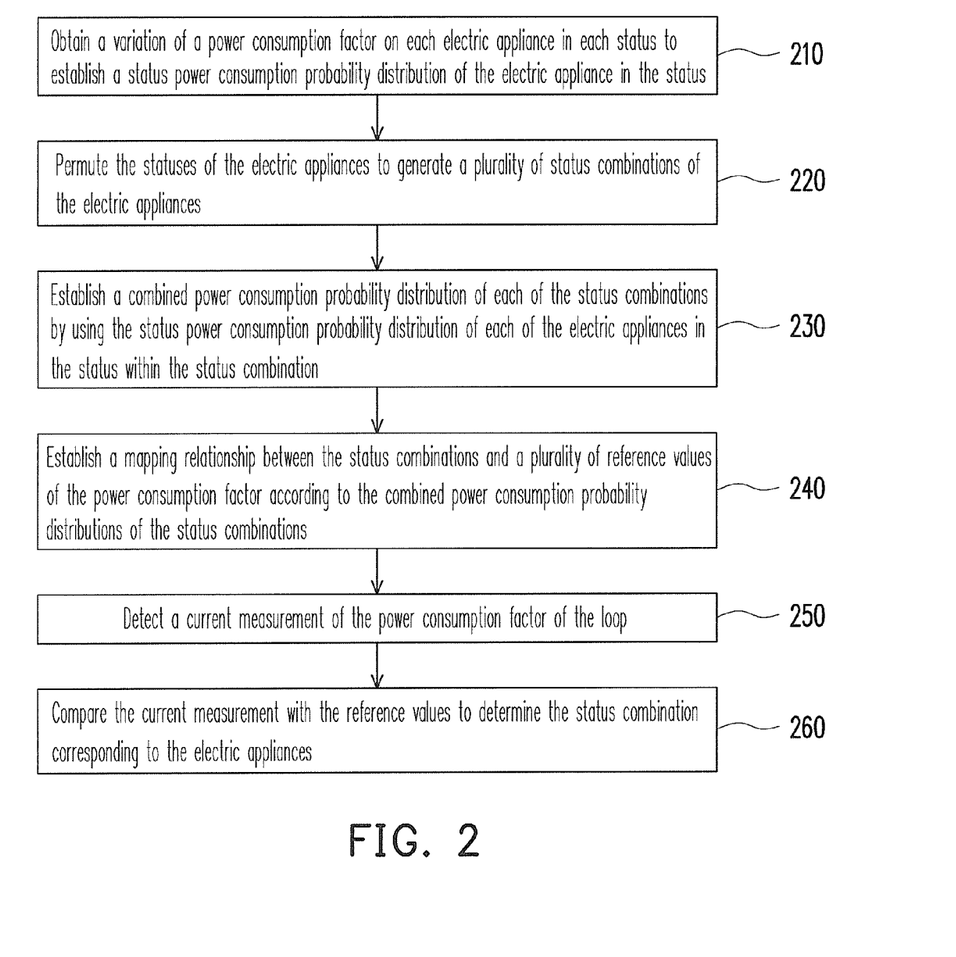
FIG. 2 is a flowchart of an electric appliance status recognition method according to an embodiment of the present invention.

The detail operation flow of the electric appliance status recognition system 100 will be further described with reference to another embodiment of the present invention. FIG. 2 is a flowchart of an electric appliance status recognition method according to an embodiment of the present invention.

Figure 3:
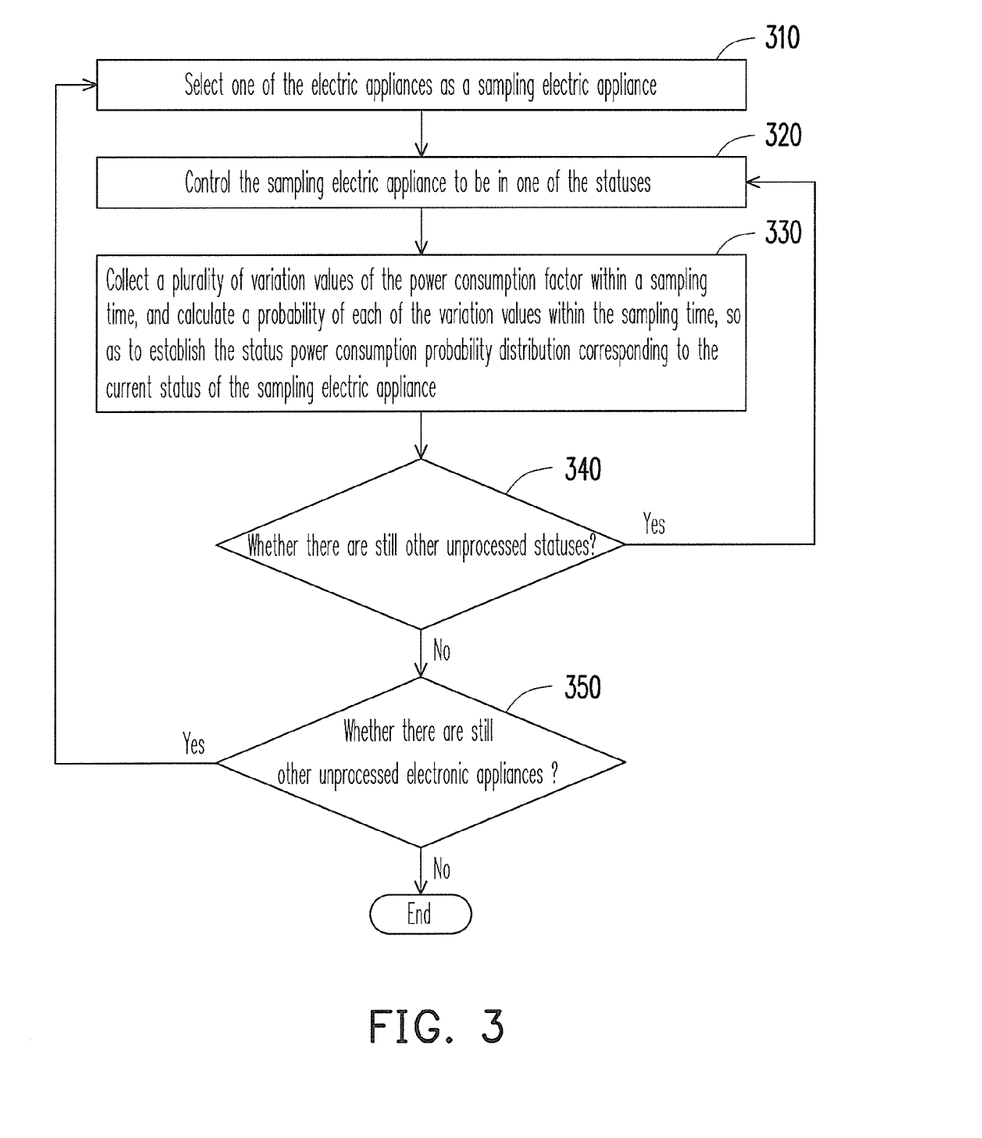
FIG. 3 is a flowchart illustrating how to establish a status power consumption probability distribution according to an embodiment of the present invention.

Referring to both FIG. 1 and FIG. 2, first, in step 210, the status factor establishing module 120 obtains a variation of the power consumption factor on each electric appliance in a loop in each status and establishes a status power consumption probability distribution of each electric appliance in each status. The detailed steps of establishing the status power consumption probability distribution will be described herein with reference to FIG. 3. Referring to FIG. 3, in step 310, the status factor establishing module 120 first selects one of the electric appliances in the loop as a sampling electric appliance.

Then, in step 320, the sampling electric appliance is controlled to be in one of its statuses. In step 330, the status factor establishing module 120 collects a plurality of variation values of the power consumption factor within a sampling time and calculates a probability of each of the variation values within the sampling time, so as to establish a status power consumption probability distribution of the sampling electric appliance in the current status. Herein the sampling time may be provided by a user. To be specific, the user sets the sampling time of the electric appliances according to operation factors of the electric appliances. The probability of each variation value within the sampling time is calculated according to the occurrence time of the variation value and the sampling time.

Next, in step 340, whether there are other unprocessed statuses of the sampling electric appliance is determined. If so, foregoing steps 320-340 are repeated to establish the status power consumption probability distributions of the sampling electric appliance in other statuses through the method described above. After all the statuses of the sampling electric appliance have been processed (i.e., the status power consumption probability distributions of all the statuses have been generated), in step 350, whether there are other unprocessed electric appliances in the loop is determined. If so, the procedure returns to step 310, wherein the status factor establishing module 120 selects another electric appliance as the sampling electric appliance and repeats foregoing steps to establish the status power consumption probability distribution corresponding to each status of the new sampling electric appliance.

Figure 4A:
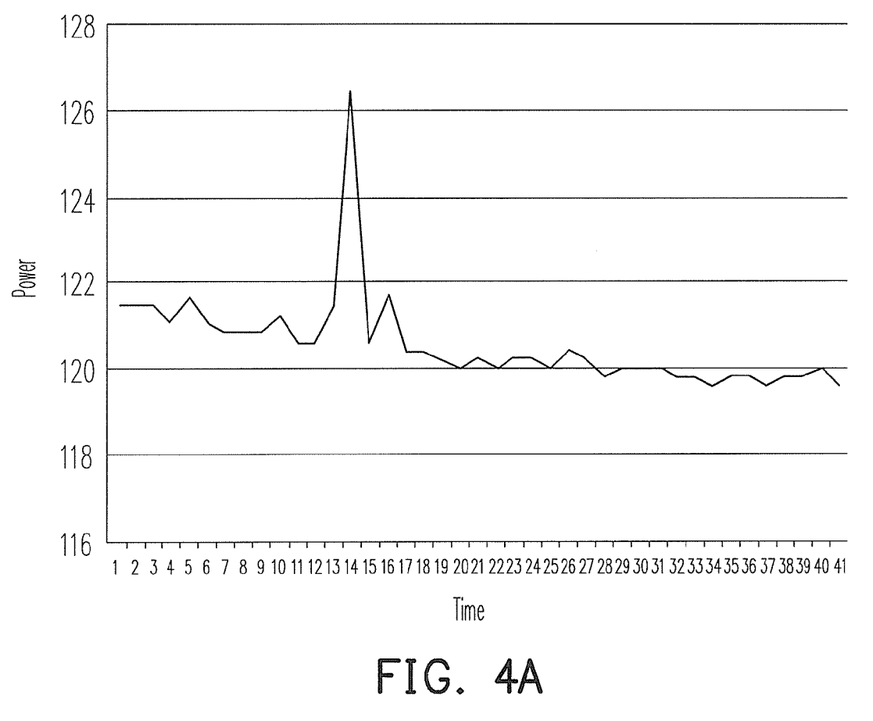
FIG. 4A is a diagram illustrating the variation of a power consumption factor within a sampling time according to an embodiment of the present invention.
Figure 4B:
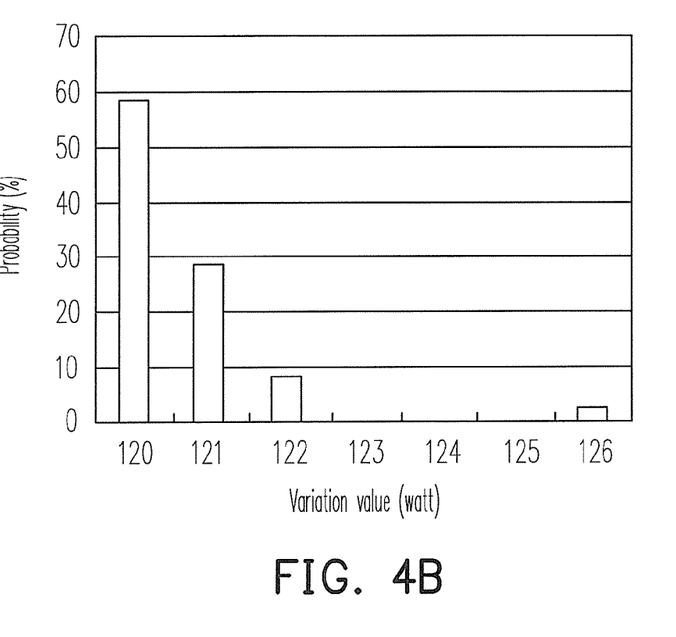
FIG. 4B is a diagram illustrating a status power consumption probability distribution according to an embodiment of the present invention.

Through the steps illustrated in FIG. 3, the status factor establishing module 120 respectively establishes the status power consumption probability distribution corresponding to each status of each electric appliance in the loop. In following embodiments, the power consumption factor is assumed to be power, and the sampling time of an electric appliance A in the loop is assumed to be 42 seconds. FIG. 4A illustrates the variation of power within 42 seconds when the electric appliance A is turned on. The status factor establishing module 120 obtains that the power of 120 watts occurs for 25 seconds, the power of 121 watts occurs for 12 seconds, the power of 122 watts occurs for 3 seconds, the power of 123 watts, 124 watts, and 125 watts occurs for 0 second, and the power of 126 watts occurs for 2 seconds within the 42 seconds according to the information illustrated in FIG. 4A. Based on this statistical data, the status power consumption probability distributions established by the status factor establishing module 120 when the electric appliance A is turned on are as illustrated in FIG. 4B, wherein the probability of the power of 120 watts during the sampling time (42 seconds) is 59.5%, the probability of the power of 121 watts during the sampling time is 28.6%, the probability of the power of 122 watts during the sampling time is 7.1%, and the probability of the power of 126 watts during the sampling time is 4.8%. It should be mentioned that in the present embodiment, even though the status power consumption probability distributions of an electric appliance in different statuses are presented in the bar chart in FIG. 4B, in other embodiments, the status factor establishing module 120 may also record or display the status power consumption probability distributions in other types of charts or tables. In other words, the method of recording or displaying the status power consumption probability distributions is not limited in the present invention.

After establishing the status power consumption probability distribution of each electric appliance in the loop in each status, in step 220 of FIG. 2, the status factor establishing module 120 permutes the statuses of the electric appliances to generate a plurality of status combinations of the electric appliances. To be specific, each status combination includes n statuses, and the n statuses are respectively corresponding to the n electric appliances in the loop, and each of the n statuses is one of the statuses of the corresponding electric appliance. For example, assuming that there are 4 electric appliances in the loop and each electric appliance has 2 statuses, the status factor establishing module 120 then generates 16 (i.e., $2^4$) status combinations. Assuming that there are 4 electric appliances in the loop, one of the electric appliances has 4 statuses, and the other three electric appliances respectively have 2 statuses, the status factor establishing module 120 then generates 32 (i.e., $4 \times 2^3$) status combinations.

Thereafter, in step 230, the status factor establishing module 120 establishes a combined power consumption probability distribution with respect to each of the status combinations by using the status power consumption probability distributions corresponding to the statuses of the electric appliances in the status combination. Below, the detailed steps of establishing the combined power consumption probability distribution will be described with reference to FIG. 5. First, in step 510, the status factor establishing module 120 selects one of the status combinations as a processed combination.

Figure 6A:
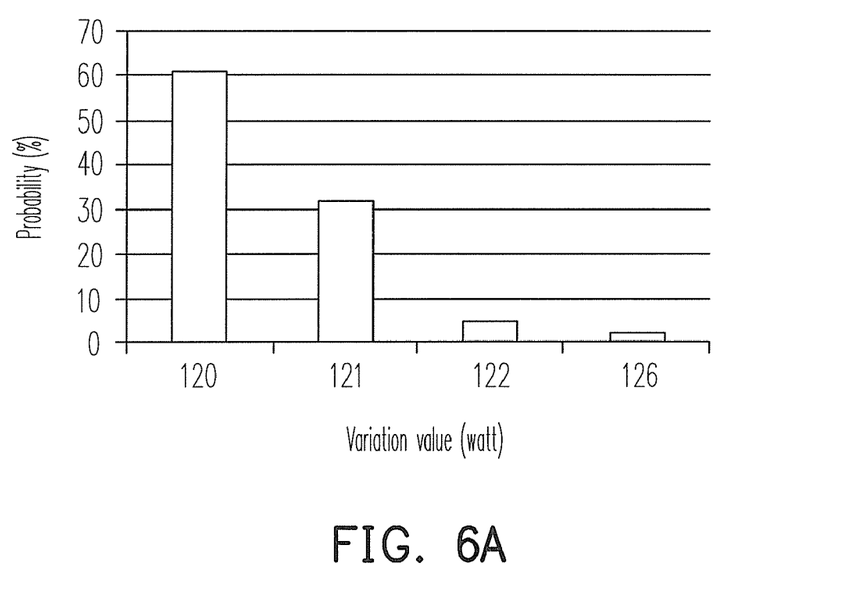
FIG. 6A and FIG. 6B are diagrams respectively illustrating a status power consumption probability distribution according to an embodiment of the present invention.
Figure 6B:
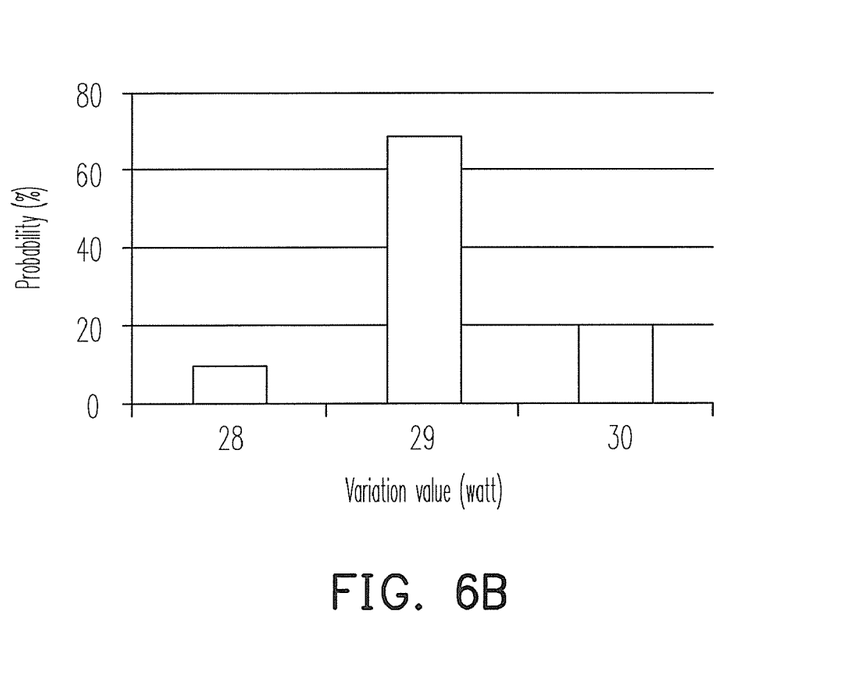

Then, in step 520, the status factor establishing module 120 obtains a plurality of sums of variation values according to the status power consumption probability distributions of the electric appliances in the statuses defined by the processed combination. To be specific, here it is assumed that the power consumption factor is power, there are two electric appliances A and B in the loop, and each of the two electric appliances has two statuses "on" and "off". If the status power consumption probability distribution corresponding to the "on" status of the electric appliance A contains 4 variation values (respectively 120 watts, 121 watts, 122 watts, and 126 watts, as shown in FIG. 6A), and the status power consumption probability distribution corresponding to the "on" status of the electric appliance B contains 3 variation values (respectively 28 watts, 29 watts, and 30 watts, as shown in FIG. 6B). One variation value is respectively obtained from each of foregoing two status power consumption probability distributions, and the two variation values are combined together. After removing repeated combinations, 8 sums of variation values (respectively 148 watts, 149 watts, 150 watts, 151 watts, 152 watts, 154 watts, 155 watts, and 156 watts) are generated.

After that, in step 530, the status factor establishing module 120 calculates the probabilities of the sums of variation values of the electric appliances in the processed combination according to the status power consumption probability distributions of the electric appliances in the statuses defined by the status combination, so as to establish a combined power consumption probability distribution of the processed combination.

Figure 6C:
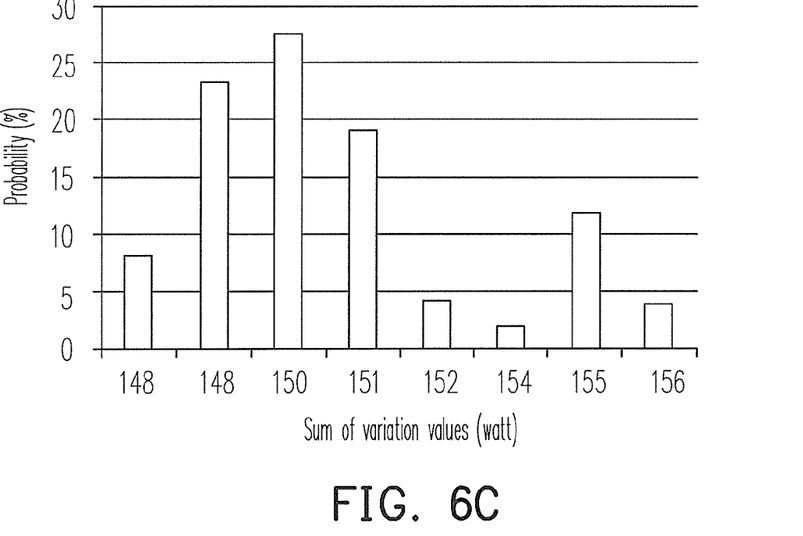
FIG. 6C is a diagram illustrating a combined power consumption probability distribution according to an embodiment of the present invention.

Below, the probability of x watts will be denoted as P(x). As shown in FIG. 6A and FIG. 6B, when the electric appliance A and the electric appliance B are both in the "on" status, the probability P(148) of 148 watts (one of the sums of variation values) is the product of the probability P(120) of the variation value of 120 watts when the electric appliance A is in the "on" status and the probability P(28) of the variation value of 28 watts when the electric appliance B is in the "on" status (i.e., P(148)=P(120)×P(28)). However, when the electric appliance A and the electric appliance B are both in the "on" status, if the power consumption is 149 watts, it may be that the electric appliance A consumes 120 watts and the electric appliance B consumes 29 watts or the electric appliance A consumes 121 watts and the electric appliance B consumes 28 watts. Thus, the probability P(149) of the sum of variation values being 149 watts is a sum of all probabilities of different variations that can add up to 149 watts (i.e., P(149)=P(120)× P(29)+P(121)×P(28)). If three different sets of variation values produce the same sum, the probability of the said sum is obtained by multiplying the probabilities of the variation values in each set to obtain three products and then adding up the three products. As described in foregoing embodiment, the combined power consumption probability distribution corresponding to the processed combination having the electric appliance A and the electric appliance B both in the "on" status is as shown in FIG. 6C.

Figure 5:
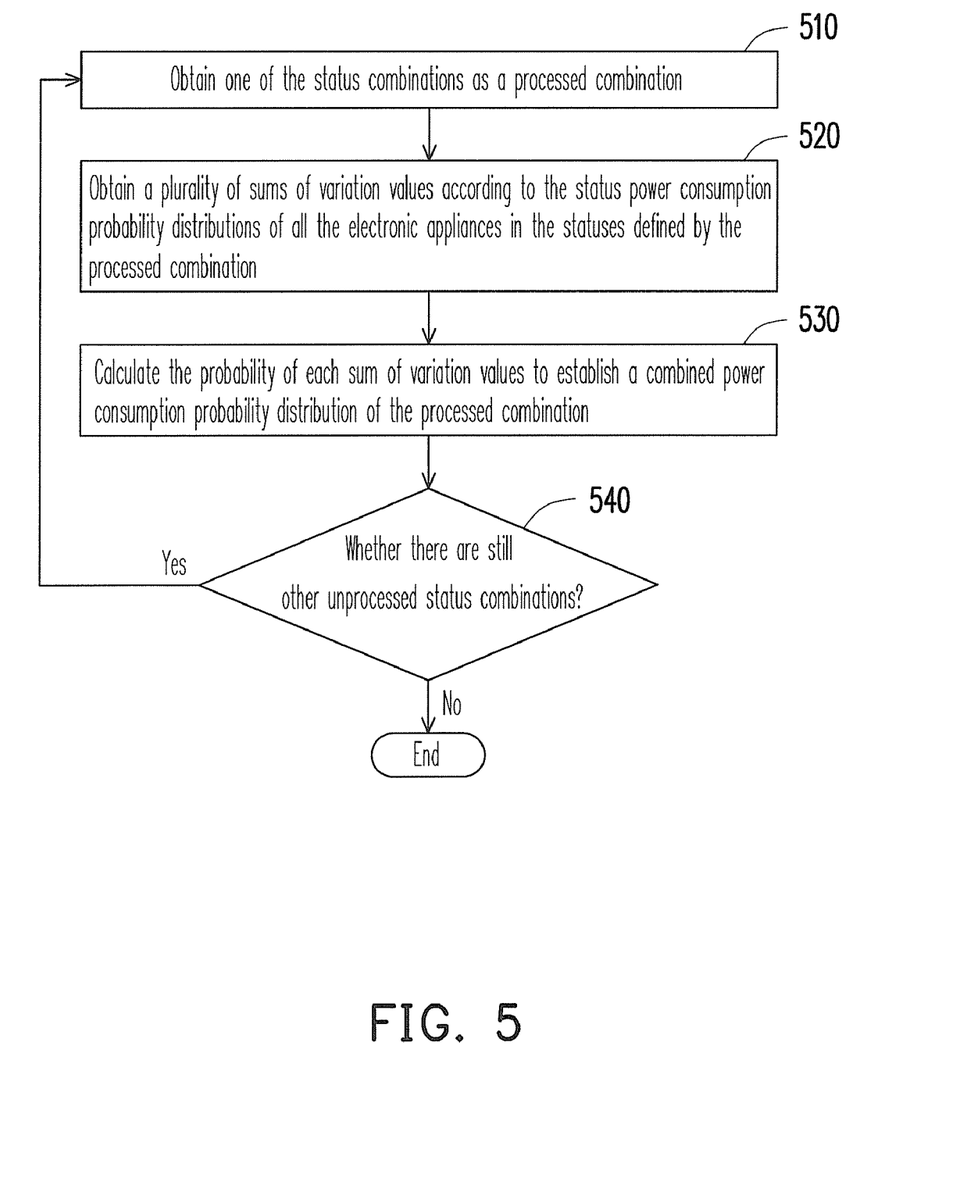
FIG. 5 is a flowchart illustrating how to establish a combined power consumption probability distribution according to an embodiment of the present invention.

In step 540 of FIG. 5, the status factor establishing module 120 determines whether there still are other unprocessed status combinations. If so, the procedure returns to step 510, wherein the status factor establishing module 120 selects another status combination as the processed combination and repeats the steps illustrated in FIG. 5 until all the status combinations are processed. Namely, through the steps illustrated in FIG. 5, the status factor establishing module 120 establishes a combined power consumption probability distribution corresponding to each status combination. Similarly, even though the combined power consumption probability distributions are illustrated in a bar chart in the present embodiment, the method of recording and displaying the combined power consumption probability distributions is not limited in the present invention.

Thereafter, in step 240 of FIG. 2, the status factor establishing module 120 establishes a mapping relationship between the status combinations and a plurality of reference values of the power consumption factor according to the combined power consumption probability distributions of the status combinations. To be specific, the status factor establishing module 120 first serves the sums of variation values in the combined power consumption probability distributions of the status combinations as the reference values. If the sums of variation values appear only in the combined power consumption probability distribution of a single status combination, the status factor establishing module 120 directly sets the mapping relationship between the reference values corresponding to the sums of variation values and the single status combination. If the sums of variation values appear in the combined power consumption probability distributions of multiple status combinations, the status factor establishing module 120 first sets the mapping relationship between the reference values corresponding to the sums of variation values and the multiple status combinations and then recomposes the probabilities of the sums of variation values in the combined power consumption probability distributions of the multiple status combinations, so as to generate a plurality of recomposed probabilities corresponding to the multiple status combinations.

Assuming that there are 4 electric appliances in the loop and each of the electric appliances has 2 statuses, the status factor establishing module 120 then establishes 16 combined power consumption probability distributions corresponding to 16 status combinations. Assuming that each combined power consumption probability distribution is expressed in a bar chart, if the 16 combined power consumption probability distributions do not overlap each other after the 16 combined power consumption probability distributions are arranged according to the sums of variation values, it is determined that the sums of variation values respectively in the 16 combined power consumption probability distributions appear in the combined power consumption probability distribution of a single status combination. Thus, the status factor establishing module 120 directly sets the mapping relationship between the reference values corresponding to the sums of variation values and the single status combination.

Figure 7:
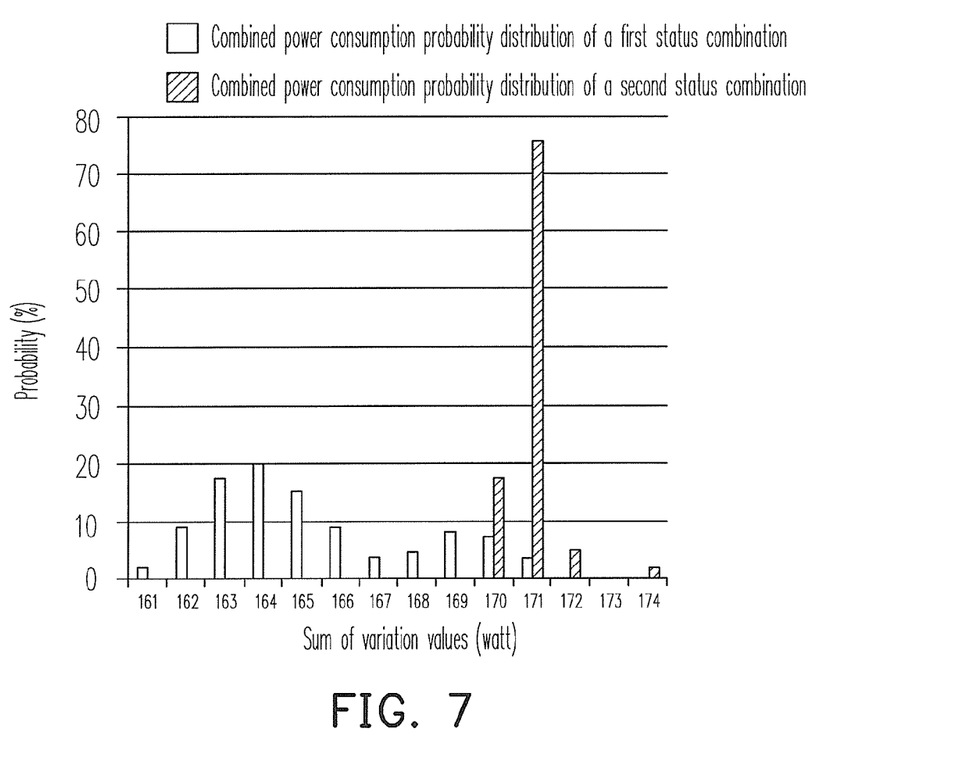
FIG. 7 is a diagram illustrating two overlapping combined power consumption probability distributions according to an embodiment of the present invention.

In another embodiment, it is assumed that the combined power consumption probability distribution of a first status combination contains 11 sums of variation values (161 watts to 171 watts), and the combined power consumption probability distribution of a second status combination contains 4 sums of variation values (170 watts to 172 watts, and 174 watts), the status factor establishing module 120 serves these sums of variation values as the reference values. As shown in FIG. 7, the combined power consumption probability distribution of the first status combination and the combined power consumption probability distribution of the second status combination overlap each other when the sum of variation values is 170 watts and 171 watts. Thus, the status factor establishing module 120 sets the mapping relationship between the sum of variation values of 170 watts (also referred to as a reference value) and the first and the second status combination and the mapping relationship between the sum of variation values of 171 watts (also referred to as a reference value) and the first and the second status combination. In addition, regarding the two sums of variation values of 170 watts and 171 watts, the status factor establishing module 120 respectively calculates a recomposed probability corresponding to the first status combination and the second status combination through a probability recomposition method.

Taking the sum of variation values of 171 watts as an example, the probability P(171) corresponding to 171 watts is 5% in the combined power consumption probability distribution of the first status combination and 75% in the combined power consumption probability distribution of the second status combination. Thus, when the power of the loop is 171 watts, the status factor establishing module 120 determines that the possibility of the electric appliances in the loop belonging to the first status combination is 6.3% (5/(5+75)×100%) and the possibility of the electric appliances in the loop belonging to the second status combination is 93.7% (75/(5+75)×100%), wherein 6.3% and 93.7% are the recomposed probabilities respectively corresponding to the first status combination and the second status combination with the sum of variation values of 171 watts (also referred to as a reference values).

In an embodiment, the status factor establishing module 120 may record the mapping relationship between the status combinations and the reference values into a status factor table such that the status combination corresponding to a reference value can be obtained through table lookup.

While the status of each electric appliance in the loop is to be actually recognized, in step 250 of FIG. 2, the electric appliance status recognition module 130 obtains a current measurement of the power consumption factor of the loop from the power consumption factor sensor 110. In the last step 260, the electric appliance status recognition module 130 compares the current measurement with the reference values to determine the status combination corresponding to the electric appliances.

In an embodiment, the electric appliance status recognition module 130 has to determine whether a variation between the current measurement and a previous measurement of the power consumption factor of the loop is greater than a predetermined value, and the statuses of the electric appliances are recognized only when the variation between the current measurement and the previous measurement is greater than the predetermined value, wherein the predetermined value may be set by a user or a smallest measurement variation of the power consumption factor on each electric appliance in the loop.

After comparing the current measurement with the reference values, the electric appliance status recognition module 130 locates a target reference value tallying with the current measurement among all the reference values. If the target reference value is corresponding to a single status combination, the electric appliance status recognition module 130 directly determines that the electric appliances belong to the single status combination.

However, if the target reference value is corresponding to multiple status combinations, in an embodiment, the electric appliance status recognition module 130 respectively obtains the recomposed probability of each status combination and determines that the electric appliances belong to the status combination having a higher recomposed probability. In another embodiment, the electric appliance status recognition module 130 obtains a previous status combination corresponding to the electric appliances, compares the previous status combination with each candidate status combinations, and determines that the electric appliances belong to the status combination having a smaller variation from the previous status combination.

After the status of each electric appliance in the loop is recognized, the result output device 140 outputs the result to be inspected by the user. The status change of each electric appliance in the loop can be determined (and accordingly the usage time of the electric appliance can be further calculated) by simply recording each electric appliance status recognition result. After the usage time of each electric appliance is calculated, the power consumption situation and related expense of each electric appliance can be further calculated. In other words, in the electric appliance status recognition system 100, it is not needed to dispose any additional measuring device on each electric appliance. Instead, the current status of each electric appliance in a loop can be determined by using a single power consumption factor sensor 110 to detect the current measurement of a power consumption factor of the entire loop, wherein the power consumption factor sensor 110 is capable of detecting a single power consumption factor.

As described, the present invention provides a method and a system for recognizing the statuses of electric appliances, wherein the status of each electric appliance in a loop is determined according to the probability distribution of a single power consumption factor on each electric appliance by comparing a current measurement of the power consumption factor of the loop with reference values of the power consumption factor. Thus, it is not needed to dispose any additional measuring device on each electric appliance, so that the cost of status recognition is reduced. In addition, the statuses of the electric appliances can be recognized by using a single power consumption factor, so that the calculation process is simplified, and accordingly the recognition efficiency is greatly increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electric appliance status recognition method, suitable for detecting n electric appliances in a loop according to a single power consumption factor, wherein the electric appliances respectively have a plurality of statuses, and n is a positive integer, the electric appliance status recognition method comprising:

obtaining a variation of the power consumption factor on each of the electric appliances in each of the statuses to establish a status power consumption probability distribution of the electric appliance in the status;

permuting the statuses of the electric appliances to generate a plurality of status combinations of the electric appliances;

establishing a combined power consumption probability distribution of each of the status combinations by using the status power consumption probability distribution of each of the electric appliances in one of the statuses within the status combination;

establishing a mapping relationship between the status combinations and a plurality of reference values of the power consumption factor according to the combined power consumption probability distributions of the status combinations;

detecting a current measurement of the power consumption factor of the loop; and comparing the current measurement with the reference values to determine the status combination corresponding to the electric appliances.

2. The electric appliance status recognition method according to claim 1, wherein the step of obtaining the variation of the power consumption factor on each of the electric appliances in each of the statuses to establish the status power consumption probability distribution of the electric appliance in the status comprises:

selecting one of the electric appliances as a sampling electric appliance;

collecting a plurality of variation values of the power consumption factor within a sampling time with the sampling electric appliance in each of the statuses, and calculating a probability of each of the variation values within the sampling time, so as to establish the status power consumption probability distribution of each of the statuses; and obtaining another one of the electric appliances as the sampling electric appliance, and repeating aforementioned steps until all the electric appliances are processed.

3. The electric appliance status recognition method according to claim 1, wherein the step of establishing the combined power consumption probability distribution of each of the status combinations by using the status power consumption probability distribution of each of the electric appliances in one of the statuses within the status combination comprises:

calculating probabilities of a plurality of sums of variation values of the electric appliances in each of the status combinations according to the status power consumption probability distributions of the electric appliances in the statuses defined by the status combination, so as to establish the combined power consumption probability distribution.

4. The electric appliance status recognition method according to claim 3, wherein the step of establishing the mapping relationship between the status combinations and the reference values of the power consumption factor according to the combined power consumption probability distributions of the status combinations comprises:

serving the sums of variation values in the combined power consumption probability distributions of the status combinations as the reference values;

when the sums of variation values only appear in the combined power consumption probability distribution of a single status combination among the status combinations, setting a mapping relationship between the reference values corresponding to the sums of variation values and the single status combination; and when the sums of variation values appear in the combined power consumption probability distributions of multiple status combinations among the status combinations, setting a mapping relationship between the reference values corresponding to the sums of variation values and the multiple status combinations, and recomposing the probabilities of the sums of variation values in the combined power consumption probability distributions of the multiple status combinations to generate a plurality of recomposed probabilities corresponding to the multiple status combinations.

5. The electric appliance status recognition method according to claim 1, wherein the step of comparing the current measurement with the reference values to determine the status combination corresponding to the electric appliances further comprises:

determining whether a variation between the current measurement and a previous measurement of the power consumption factor of the loop is greater than a predetermined value; and if the variation between the current measurement and the previous measurement is greater than the predetermined value, comparing the current measurement with the reference values to determine the status combination corresponding to the electric appliances.

6. The electric appliance status recognition method according to claim 1, wherein the step of comparing the current measurement with the reference values to determine the status combination corresponding to the electric appliances further comprises:

locating a target reference value tallying with the current measurement among the reference values; and if the target reference value is corresponding to a single status combination among the status combinations, determining that the electric appliances are in the statuses defined by the single status combination.

7. The electric appliance status recognition method according to claim 1, wherein the step of comparing the current measurement with the reference values to determine the status combination corresponding to the electric appliances further comprises:

locating a target reference value tallying with the current measurement among the reference values;

if the target reference value is corresponding to multiple status combinations among the status combinations, respectively obtaining a recomposed probability of each of the multiple status combinations; and determining that the electric appliances are in the statuses defined by one of the multiple status combinations having the higher recomposed probability.

8. The electric appliance status recognition method according to claim 1, wherein the step of comparing the current measurement with the reference values to determine the status combination corresponding to the electric appliances further comprises:

locating a target reference value tallying with the current measurement among the reference values;

if the target reference value is corresponding to multiple status combinations among the status combinations, obtaining a previous status combination corresponding to the electric appliances; and comparing the previous status combination with the multiple status combinations to determine that the electric appliances are in the statuses defined by one of the multiple status combinations having a smaller variation from the previous status combination.

9. The electric appliance status recognition method according to claim 1, wherein the power consumption factor comprises one of power, volt-ampere, volt, watt-hour, kilowatt-hour, reactive power, and current.

10. An electric appliance status recognition system, comprising:

a power consumption factor sensor, for detecting a measurement of a power consumption factor of a loop, wherein the loop comprises n electric appliances, the electric appliances respectively have a plurality of statuses, and n is a positive integer;

a status factor establishing module, for obtaining a variation of the power consumption factor on each of the electric appliances in each of the statuses to establish a status power consumption probability distribution of the electric appliance in the status, permuting the statuses of the electric appliances to generate a plurality of status combinations of the electric appliances, establishing a combined power consumption probability distribution of each of the status combinations by using the status power consumption probability distribution of each of the electric appliances in one of the statuses within the status combination, and establishing a mapping relationship between the status combinations and a plurality of reference values of the power consumption factor according to the combined power consumption probability distributions of the status combinations; and an electric appliance status recognition module, coupled to the power consumption factor sensor and the status factor establishing module, for obtaining a current measurement of the power consumption factor of the loop from the power consumption factor sensor and comparing the current measurement with the reference values to determine the status combination corresponding to the electric appliances.

11. The electric appliance status recognition system according to claim 10, wherein the status factor establishing module selects one of the electric appliances as a sampling electric appliance, collects a plurality of variation values of the power consumption factor within a sampling time with the sampling electric appliance in each of the statuses, and calculates a probability of each of the variation values within the sampling time, so as to establish the status power consumption probability distribution of each of the statuses, and the status factor establishing module selects another one of the electric appliances as the sampling electric appliance and repeats aforementioned operations until all the electric appliances are processed.

12. The electric appliance status recognition system according to claim 10, wherein the status factor establishing module calculates probabilities of a plurality of sums of variation values of the electric appliances in each of the status combinations according to the status power consumption probability distributions of the electric appliances in the statuses defined by the status combination, so as to establish the combined power consumption probability distribution.

13. The electric appliance status recognition system according to claim 12, wherein the status factor establishing module serves the sums of variation values in the combined power consumption probability distributions of the status combinations as the reference values, when the sums of variation values only appear in the combined power consumption probability distribution of a single status combination among the status combinations, the status factor establishing module sets a mapping relationship between the reference values corresponding to the sums of variation values and the single status combination, when the sums of variation values appear in the combined power consumption probability distributions of multiple status combinations among the status combinations, the status factor establishing module sets a mapping relationship between the reference values corresponding to the sums of variation values and the multiple status combinations, and recomposes the probabilities of the sums of variation values in the combined power consumption probability distributions of the multiple status combinations to generate a plurality of recomposed probabilities corresponding to the multiple status combinations.

14. The electric appliance status recognition system according to claim 10, wherein the electric appliance status recognition module determines whether a variation between the current measurement and a previous measurement of the power consumption factor of the loop is greater than a predetermined value, and if the variation between the current measurement and the previous measurement is greater than the predetermined value, the electric appliance status recognition module compares the current measurement with the reference values to determine the status combination corresponding to the electric appliances.

15. The electric appliance status recognition system according to claim 10, wherein the electric appliance status recognition module locates a target reference value tallying with the current measurement among the reference values, and if the target reference value is corresponding to a single status combination among the status combinations, the electric appliance status recognition module determines that the electric appliances are in the statuses defined by the single status combination.

16. The electric appliance status recognition system according to claim 10, wherein the electric appliance status recognition module locates a target reference value tallying with the current measurement among the reference values, and if the target reference value is corresponding to multiple status combinations among the status combinations, the electric appliance status recognition module respectively obtains a recomposed probability of each of the multiple status combinations and determines that the electric appliances are in the statuses defined by one of the multiple status combinations having the higher recomposed probability.

17. The electric appliance status recognition system according to claim 10, wherein the electric appliance status recognition module locates a target reference value tallying with the current measurement among the reference values, and if the target reference value is corresponding to multiple status combinations among the status combinations, the electric appliance status recognition module obtains a previous status combination corresponding to the electric appliances and compares the previous status combination with the multiple status combinations to determine that the electric appliances are in the statuses defined by one of the multiple status combinations having a smaller variation from the previous status combination.

18. The electric appliance status recognition system according to claim 10 further comprising:
a result output device, coupled to the electric appliance status recognition module, for displaying the current statuses of the electric appliances.

19. The electric appliance status recognition system according to claim 10, wherein the power consumption factor comprises one of power, volt-ampere, volt, watt-hour, kilowatt-hour, reactive power, and current.

20. The electric appliance status recognition system according to claim 10, wherein the power consumption factor sensor comprises one of an ammeter, an electricity meter, a watt-hour meter, and a power meter.

* * * * *